United States Patent
Song

(10) Patent No.: US 9,325,609 B2
(45) Date of Patent: Apr. 26, 2016

(54) SEGMENTED SOURCE ROUTING IN A NETWORK

(71) Applicant: Futurewei Technologies, Inc., Plano, TX (US)

(72) Inventor: Haoyu Song, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 138 days.

(21) Appl. No.: 13/974,950

(22) Filed: Aug. 23, 2013

(65) Prior Publication Data

US 2015/0055654 A1    Feb. 26, 2015

(51) Int. Cl.
*H04L 12/721* (2013.01)
*H04L 12/717* (2013.01)
*H04L 12/741* (2013.01)

(52) U.S. Cl.
CPC ............... *H04L 45/34* (2013.01); *H04L 45/74* (2013.01); *H04L 45/42* (2013.01)

(58) Field of Classification Search
USPC ........................................................ 370/392
See application file for complete search history.

(56) References Cited

U.S. PATENT DOCUMENTS

| | | | |
|---|---|---|---|
| 2004/0218582 A1* | 11/2004 | Kennedy et al. | 370/351 |
| 2007/0058638 A1 | 3/2007 | Guichard et al. | |
| 2010/0232435 A1 | 9/2010 | Jabr et al. | |
| 2011/0128962 A1* | 6/2011 | Hunkeler et al. | 370/393 |
| 2011/0317701 A1* | 12/2011 | Yamato et al. | 370/392 |
| 2012/0230255 A1* | 9/2012 | Li et al. | 370/328 |
| 2013/0250811 A1* | 9/2013 | Vasseur et al. | 370/255 |
| 2014/0241345 A1* | 8/2014 | DeCusatis et al. | 370/355 |

FOREIGN PATENT DOCUMENTS

| | | |
|---|---|---|
| CN | 103152271 A | 6/2013 |
| WO | WO 2011140849 A1 * | 11/2011 |
| WO | 2013026049 A1 | 2/2013 |

OTHER PUBLICATIONS

P. Ashwood-Smith, et al., "SDN State Reduction," draft-ashwood-sdnrg-state-reduction-00.txt, Jul. 3, 2013, 21 pages.

Heszberger, et al., "Active Bloom Filters for Multicast Addressing," High-Speed Networks 20122 (HSN 2011) Workshop at IEEE INFOCOM 2011, pp. 174-179.

Heller, et al., "The Controller Placement Problem," 2012 ACM, HotSDN'12, http://conferences.sigcomm.org/sigcomm/2012/paper/hotsdn/p7.pdf, Aug. 13, 2012, Helsinki, Finland, pp. 7-12.

(Continued)

*Primary Examiner* — Michael Thier
*Assistant Examiner* — Yaotang Wang
(74) *Attorney, Agent, or Firm* — Conley Rose, P.C.; Grant Rodolph; William H. Dietrich

(57) ABSTRACT

A method implemented in a network controller configured to perform source routing, the method comprising receiving a request from a network node to determine a path for transporting a data packet from a source node to a destination node, determining the path to transport the data packet from the source node to the destination node, partitioning a description of the path into a plurality of route segments, and distributing the route segments to one or more network nodes to append routing information to the data packet, wherein the network nodes route the data packet using the appended routing information and without using a forwarding table, and wherein each of the route segments describes a portion of the path.

20 Claims, 7 Drawing Sheets

(56) References Cited

OTHER PUBLICATIONS

"Internet Protocol," Information Sciences Institute, RFC 791, Sep. 1981, 50 pages.

Casado, et al., "SANE: A Protection Architecture for Enterprise Networks," ICSI 2005, http://yuba.stanford.edu/~casado/sane.pdf, 15 pages.

Crabbe, "SDN at Google Opportunities for WAN Optimization," Aug. 1, 2012, 42 pages.

Previdi, Ed., et al., "Segment Routing with IS-IS Routing Protocol," draft-previdi-filsfils-isis-segment-routing-00, Mar. 12, 2013, 27 pages.

Ashwood-Smith, "Software Defined Networking and Centralized Controller State Distribution Reduction—Discussion of one Approach," Jul. 2012, www.ieee802.org/1/files/public/docs2012/new-ashwood-sdn-optimizations-0712-v01.pdf, 8 pages.

Reitzel, "Depreciation of Source Routing Options in IPv4," draft-reitzel-ipv4-source-routing-is-evil-00, Aug. 29, 2007, 6 pages.

Soliman, et al., "Source Routed Forwarding with Software Defined Control, Considerations and Implications," http://conferences.sigcomm.org/co-next/2012-eproceedings/student/p43.pdf, pp. 43-44.

"OpenFlow," www.openflow.org, downloaded from the Internet Jun. 10, 2015, 3 pages.

"Open Networking Foundation," www.opennetworking.org, downloaded from the Internet Jun. 10, 2015, 2 pages.

"Protocol Oblivious Forwarding," www.poforwarding.org, downloaded from the Internet Jun. 10, 2015, 1 page.

Foreign Communication From a Counterpart Application, PCT Application No. PCT/CN2014/084765, International Search Report dated Nov. 26, 2014, 7 pages.

Foreign Communication From a Counterpart Application, PCT Application No. PCT/CN2014/084765, Written Opinion dated Nov. 26, 2014, 5 pages.

\* cited by examiner

SEGMENTED SOURCE ROUTING IN A NETWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Software defined networking (SDN) is a form of network architecture in which a control plane is separated from a data plane and implemented as a software application. This architecture allows network administrators to have programmable logically centralized control of network traffic without requiring physical access to the network's hardware devices. Thus, SDN decouples network control (learning and forwarding decisions) from network topology (junctions, interfaces, and how they peer). Decoupling network control from network topology enables better routing decisions and resource utilization based on centrally collected and managed global network topology, states, and applications or traffic flow patterns. SDN may simplify network operations since centralized controller can pre-specify an alternate routing path and configure network equipment automatically, and global definitions per identity do not have to be matched to each and every interface location. The basic approach to achieve decoupling of the network control from the network topology is to apply globally aware and topology decoupled software control at the edges of the network. The assumption is that traditional topology-coupled bridging and routing drives the core of the network so that scalability, interoperability, high-availability, and extensibility of Internet Protocol (IP) networks can be maintained.

Some of the network nodes within a SDN network may operate in the data plane to forward data to other network nodes within the SDN network. Typically, network nodes may obtain forwarding tables from a SDN controller and use the forwarding tables to route and forward data to other network nodes. Using forwarding tables, unfortunately, increases route convergence time and routing latency. Source routing, as described in the Internet Engineering Task Force (IETF) document draft-ashwood-sdnrg-state-reduction-00.txt, entitled "SDN State Reduction," published Jul. 3, 2013, which is incorporated herein as if reproduced in its entirety, simplifies data forwarding network nodes and reduces routing time and latency when compared to using a forwarding table. Specifically, source routing appends and records the entire routing information for a path within the data packet. Instead of performing lookup functions using the forwarding table, a network node uses the routing information in a data packet to forward the data packet. However, long and complex paths may have large amounts of route information to represent the entire path. As a result, appending the entire route information to a data packet may reduce the effective size of the payload. Therefore, a more efficient solution is needed to route data through a SDN network.

SUMMARY

In one example embodiment, the disclosure includes a network controller configured to perform source routing. The network controller may receive a request from a network node to determine a path for transporting a data packet from a source node to a destination node. After receiving the request, the network controller may determine the path to transport the data packet from the source node to the destination node and partition the route information for the path into a plurality of route segments. The route segments may be distributed to one or more network nodes that append the routing information to the data packet. The data packet is then forwarded amongst the network nodes using the appended routing information and without using a forwarding table. Each of the route segments describes a portion of the path from the source node to the destination node.

In another example embodiment, the disclosure includes a network controller that determines a complete route to forward a data packet from a source node to a destination node. The network controller may partition a description of the complete route into a plurality of route segments and obtain a segment length variable that determines a number of intermediate nodes between each segmentation node along the complete route. The network controller may distribute the route segments to the segmentation nodes. The segmentation nodes may append routing information to the data packet based on the route segments, and the intermediate nodes along the complete route may forward the data packet using the appended routing information and without using a forwarding table.

In yet another example embodiment, the disclosure includes a network node configured to perform segmented source routing by receiving a data packet and examining a pointer that references route information appended to the data packet. The network node may subsequently forward the data packet according to route information referenced by the pointer. The route information may represent a portion of all routing information used to route the data packet from a source node to a destination node. The network node may forward the data packet without using a forwarding table.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more example embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various example embodiments to implement segmented source routing in a network, such as a SDN network. Segmented source routing means that a data packet may carry some or all of the information so the nodes on the path do not need to search a forwarding table. To minimize overhead and maximize the size of the data packet's payload, route information may be partitioned into one or more route segments and distributed to one or more segmentation nodes along a path. Each route segment may describe at least a portion or subset of the route information used to transport a data packet from a source node to a destination node via the path. The segmentation nodes may append route information to data packets traversing along the path. The route information appended to the data packets may be based on the route segment received from a network controller. Intermediate nodes located between the segmentation nodes may forward data to the appropriate network nodes using the route information appended to the data packets and without using a forwarding table.

Figure 1:
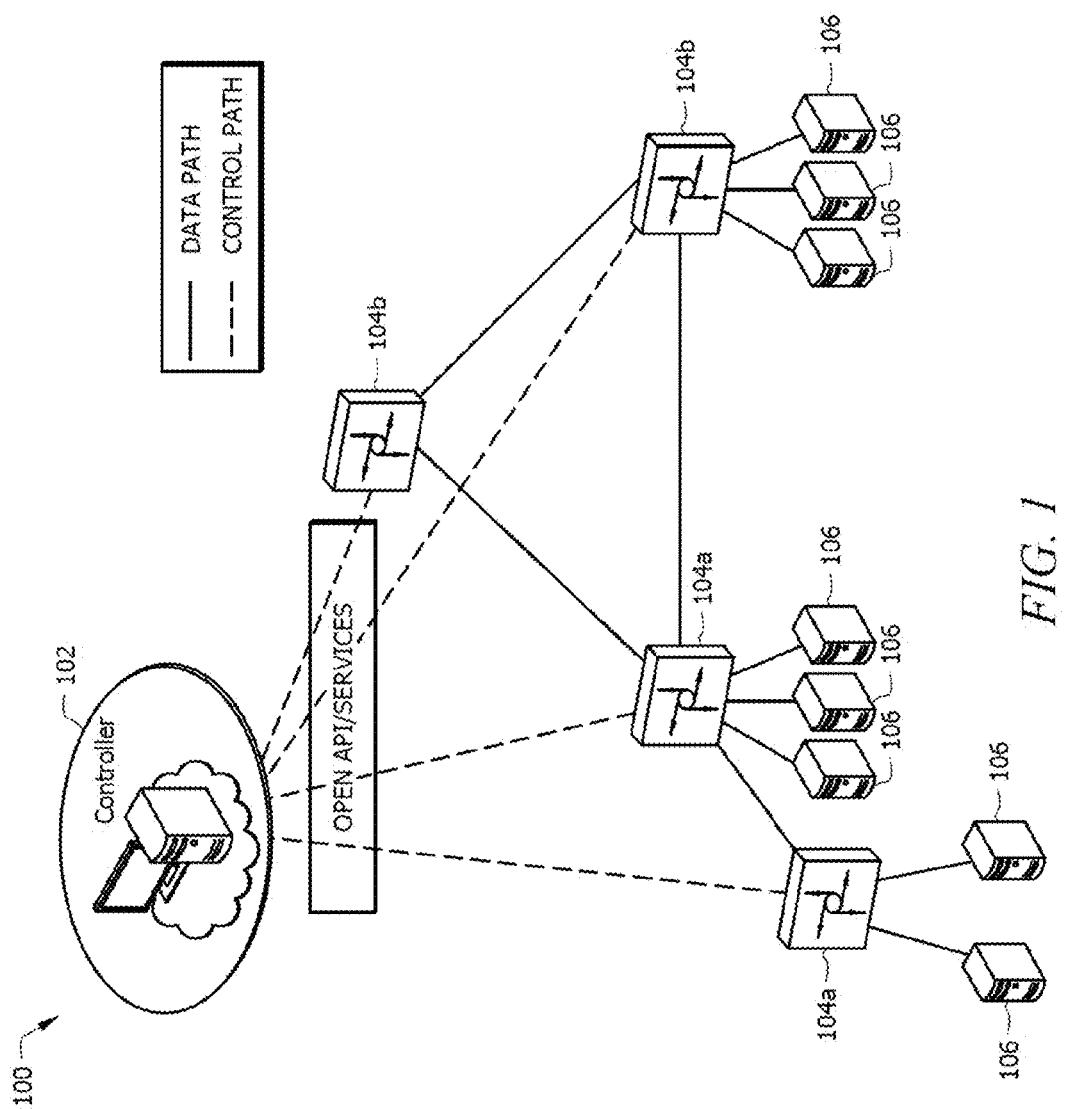
FIG. 1 is a schematic diagram of an example embodiment of a SDN.

FIG. 1 is a schematic diagram of an example embodiment of a SDN network 100 where example embodiments of the present disclosure may operate. The SDN network 100 may comprise a network controller 102, a plurality of network nodes 104, and a plurality of end nodes 106. The control path is represented by dashed lines and the data path is represented by solid lines. System configuration, management information, and route segment information may be exchanged between the network controller 102 and the network nodes 104 via the control path. Data packets may be received from end nodes 106 and forwarded between network nodes 104 via the data path. The end nodes 106 may be any network element configured to transmit, receive, originate, and/or terminate data, such as hosts, virtual machines, and/or servers. The network nodes 104 may be any device that receives and transmits data along one or more paths within the SDN network 100. In one example embodiment, the network nodes 104 may conform to one or more application programming interface (API) protocols, such as Openflow. The network nodes 104 may be switches, routers, bridges, and/or any other device that is used to forward data within the data plane of the SDN network 100. In one example embodiment, network nodes 104 may operate in the data plane, but not within the control plane. At least some of the network nodes 104 may be configured as segmentation nodes, while other network nodes 104 may be configured as intermediate nodes for any given path formed with the SDN network 100.

The network controller 102 may be any network controller configured to perform a variety of control path and/or control plane functions, such as drawing a network map and defining the information in a route segment that defines how to route incoming packets. In one example embodiment, the network controller 102 may be a SDN controller. The network controller 102 may be configured for management and control functionality of the control plane, which may include routing and resource management. The network controller 102 may receive messages from and transmit messages to the network nodes 104 via the control plane. The network controller 102 may communicate with the segmentation nodes 104 via a variety of API protocols, such as Openflow. The network controller 102 may determine the global network topology of the SDN network 100. With the global network topology, state information, dynamic traffic flow/volume information, and other network state information, the network controller 102 may make decisions on how to assign resources and route applications, information, and/or data packet flows though the SDN network 100.

As one of ordinary skill in the art are aware, although the foregoing discussion was directed toward SDN and a SDN network, the disclosed technique is not limited to that application and may instead apply equally to a plurality of network architectures and networking techniques that employ a centralized controller with a global view of a network that can control network elements in the network, all of which are intended to be encompassed by this disclosure. The use and discussion of a single architecture is served solely to facilitate ease of description and explanation.

Figure 2:
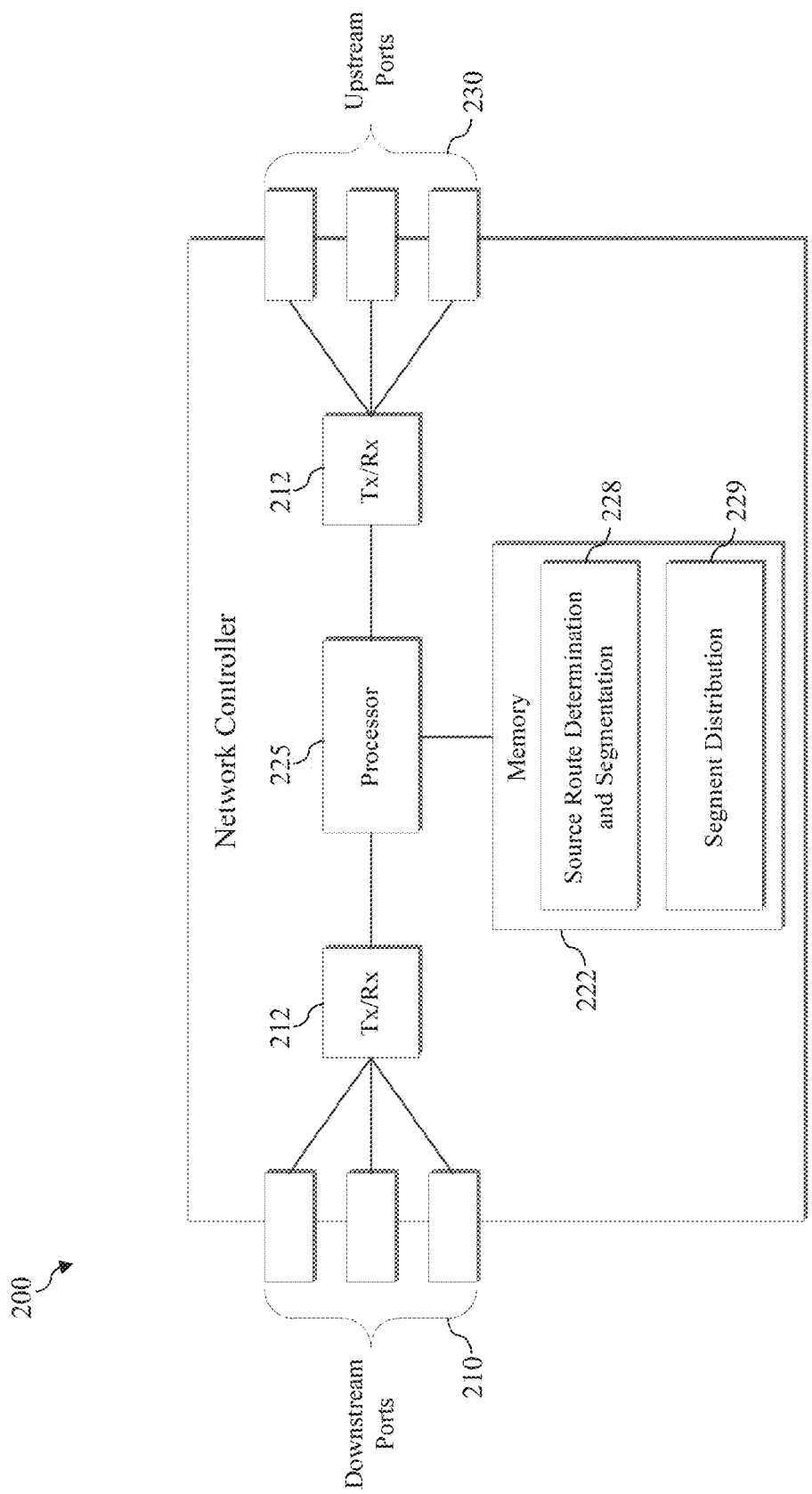
FIG. 2 is a schematic diagram of an example embodiment of a network controller.

At least some of the features/methods described in the disclosure may be implemented in a network controller and network nodes, such as a segmentation node and intermediate node. For instance, the features/methods of the disclosure may be implemented using hardware, firmware, and/or software installed to run on hardware. The network controller may be any device that communicates via the control plane, e.g., router, server, SDN controller, etc. FIG. 2 is a schematic diagram of an example embodiment of a network controller 200, which may be any device configured to provide control plane functions, such as network controller 102, shown in FIG. 1. The network controller 200 may also be configured to implement or support the segmented source routing disclosed herein.

The network controller 200 may comprise one or more downstream ports 210 coupled to a transceiver (Tx/Rx) 212, which may be transmitters, receivers, or combinations thereof. A Tx/Rx 212 may be coupled to a plurality of downstream ports 210 for transmitting and/or receiving frames from other nodes. Tx/Rx 212 may also be coupled to a plurality of upstream ports 230 for transmitting and/or receiving frames from other nodes. A processor 225 may be coupled to the Tx/Rxs 212 to process the frames and/or determine the nodes to which to send frames. The processor 225 may comprise one or more multi-core processors and/or memory modules 222, which may function as data stores, buffers, etc. Processor 225 may be implemented as a general processor or may be part of one or more application specific integrated circuits (ASICs) and/or digital signal processors (DSPs). The downstream ports 210 and/or upstream ports 230 may contain electrical and/or optical transmitting and/or receiving components. In one example embodiment, network controller 200 may be a routing component that makes routing decisions.

The memory modules 222 may be used to house the instructions for carrying out the system and methods described herein. The memory module 222 may comprise a cache for temporarily storing content, e.g., a Random Access Memory (RAM). Additionally, the memory module 222 may comprise a long-term storage for storing content relatively longer, e.g., a Read Only Memory (ROM). For instance, the cache and the long-term storage may include dynamic random-access memories (DRAMs), solid-state drives (SSDs), hard disks, or combinations thereof. The memory module 222 may comprise a source route determination and segmentation block 228 that may be implemented on the processor 225. Alternatively, the source route determination and segmentation block 228 may be implemented directly on the processor 225. The source route determination and segmentation block 228 may be used to implement method 600 disclosed in FIG. 6. For example, the source route determination and segmentation block 228 may be used to determine a path for the data in response to the request, generate route information for the path, and divide the route information into route segments.

The memory module 222 may further comprise a segment distribution block 229 that may be implemented using processor 225, or alternatively, may be implemented directly on processor 225. The segment distribution block 229 may be configured to distribute the route segments for the corresponding path to one or more segmentation nodes in the network. In one example embodiment, segment distribution block 229 may distribute the route segments simultaneously to the segmentation nodes. In another example embodiment, the segment distribution block 229 may distribute a first segment to a first segmentation node and then distribute subsequent route segments in response to requests from subsequent segmentation nodes. The source route determination and segmentation block 228 and segment distribution block 229 may be implemented using software, hardware, or both.

Figure 3:
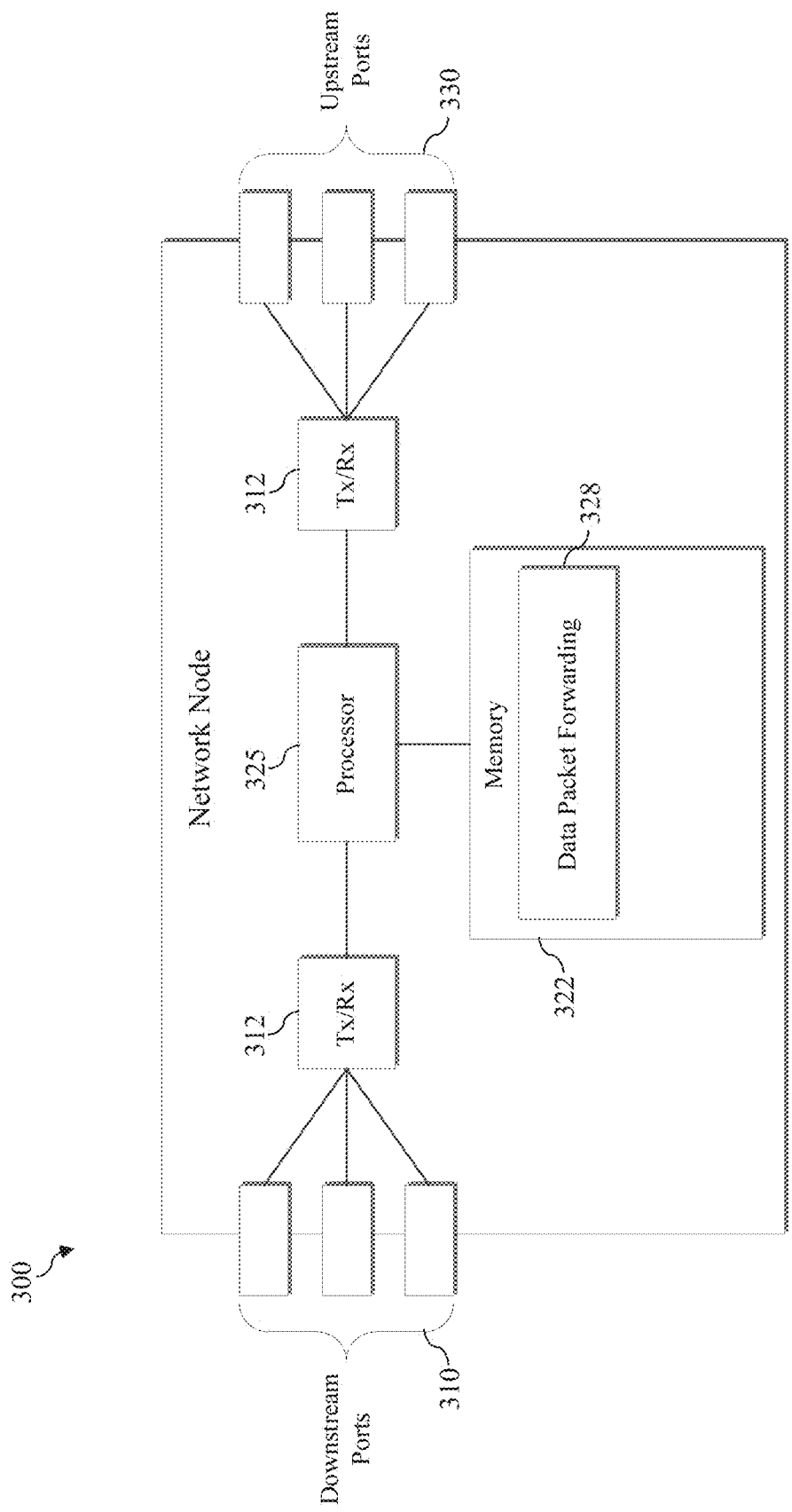
FIG. 3 is a schematic diagram of an example embodiment of a network node.

FIG. 3 is a schematic diagram of an example embodiment of a network node 300, such as a segmentation node, which may be any device that transports and processes data through a network, such as a network node 104 disclosed in FIG. 1. The network node 300 may be configured to implement or support segmented source routing disclosed herein. The network node 300 may comprise downstream ports 310, transceivers 312, memory modules 322, processor 325, and upstream ports 330 which may be substantially similar to downstream ports 210, transceivers 212, memory modules 222, processor 225, and upstream ports 230 shown in FIG. 2, respectively.

The memory module 322 may comprise a data packet forwarding block 328 that may be implemented on the processor 325. The data packet forwarding block 328 may be used to implement method 700, shown in FIG. 7. Alternatively, the data packet forwarding block 328 may be implemented directly on the processor 325. The data packet forwarding block 328 may be used to route data packets using routing information within the data packets. In one example embodiment, the data packet forwarding block 328 may update routing information contained in a data packet with new routing information received from a network controller. The data forwarding block 328 may also be used to search for and/or request an appropriate route segment if one has not yet been received from a network controller after receiving the data packet. The data packet forwarding block 328 may be implemented using software, hardware, or both.

It is understood that by programming and/or loading executable instructions onto the network controller 200 and/or segmentation node 300, at least one of the processor 225 and/or 325, the cache, and the long-term storage are changed, transforming the network controller 200 and/or network node 300 in part into a particular machine or apparatus, e.g., a segmented source routing network component, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 4:
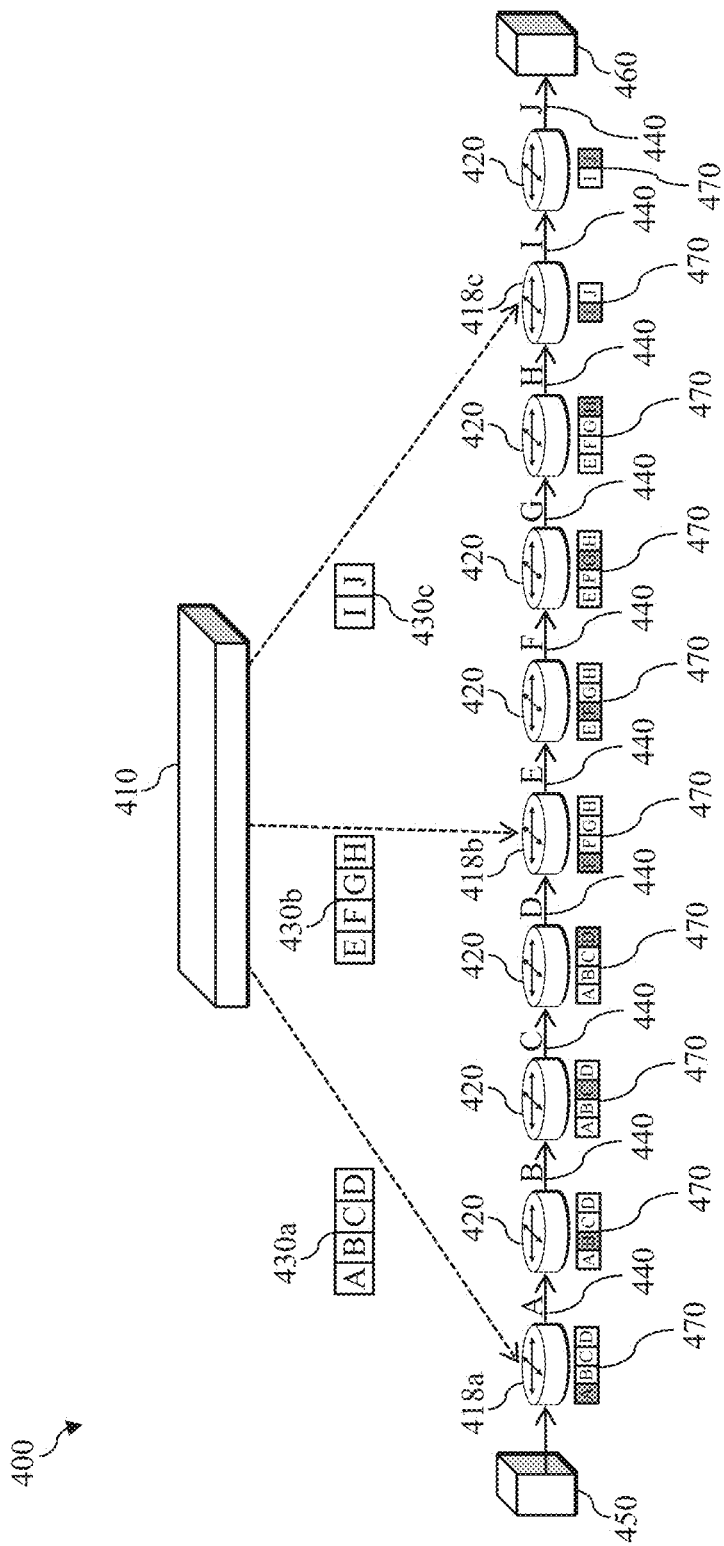
FIG. 4 is a schematic diagram of an example embodiment of a network that performs segment source routing.

FIG. 4 is a schematic diagram of an example embodiment of a network 400 that performs segmented source routing. A network controller 410 may receive from a segmentation node 418 that is coupled to a source node 450, a request for route information when the segmentation node 418 receives a data packet from source node 450. The network controller 410 may maintain the topology of the network 400, as well as the reachability information for the segmentation nodes 418 and intermediate nodes 420 in the network 400. The network controller 410 may determine the optimal path to transmit a packet from the source node 450 to the destination node 460. The network controller 410 may employ well-known routing techniques discussed below for generating the route for the data packet, such as shortest path, distance, cost, link bandwidth, latency, Interior Gateway Protocol (IGP), and/or Border Gateway Protocol (BGP) to determine the optimal path. As one of ordinary skill in the art will know, the preceding examples are non-inclusive and any suitable routing technique may be employed by the network controller in determining the optimal path for the data packet. More than one path may traverse through segmentation nodes 418 and intermediate nodes 420 within network 400. In one example embodiment, the segmentation nodes 418 shown in FIG. 4 may function as intermediate nodes 420 for one or more paths and function as segmentation nodes 418 in the other paths. Additionally, the intermediate nodes 420 shown in FIG. 4 may function as intermediate nodes 420 for one or more paths and function as segmentation nodes 418 in the other paths.

In another example embodiment, the optimal path to transmit a data packet from the source node 450 to the destination node 460 may be pre-determined by the network controller 410 prior to the data packet being received at the segmentation node 418. In either example embodiment, after determining the optimal path, the network controller 410 may partition the routing information into smaller route segments 430. The route segments 430 may comprise information that identifies a subset of links 440 in the network 400 over which the data packet should be forwarded over. The aggregate of the route segments 430 may indicate each link 440 in the network 400 over which a data packet may be transported over to reach a destination node 460 via the optimal path.

As shown in FIG. 4, the network controller 410 may transmit and install the route segments 430a, 430b, and 430c in segmentation nodes 418a, 418b, and 418c, respectively. Each segmentation node 418a-c may use the route segments 430 to determine the routing information and append the routing information to an incoming data packet. The routing information appended to the data packet may provide information to route the data packet for at least a portion of the optimal path. For example, route segment 430a may specify a data packet is to be forwarded over links 440A, B, C, and D to reach segmentation node 418b from segmentation node 418a. Segmentation node 418a may append routing information that includes information for links 440A-D to the data packet, and subsequently forward the data packet over link 440A based on the appended routing information. Routing information obtained from route segments 430 may be transmitted and appended according to any suitable method well known by one of ordinary skill in the art.

The route segments 430a-c may be distributed to segmentation nodes 418a-c in a variety of ways. In one example embodiment, before the data packet is received by segmentation node 418a, the network controller 410 may transmit and install the respective route segments 430a-c in each of the segmentation nodes 418a-c. The network controller 410 may determine which network nodes are segmentation nodes 418a-c based on a segment length "n" that is described in more detail below with respect to FIG. 5. Generally, a route segment 430 may be installed in the first network node (e.g. edge node) that receives the frame from source node 450. In FIG. 4, segmentation node 418a may be an edge node and may represent the first network node. Every "n" network node thereafter along the optimal path through which the data packet may be forwarded may be selected as segmentation nodes 418. In other words, the network controller 410 may distribute route segments 430a-c to segmentation nodes 418 on a segment boundary, e.g. a location at which a data packet is located but has been forwarded through all links 440 provided by the route information appended to the data packet. As shown in FIG. 4, the route segments 430 may be installed in segmentation nodes 418a, 418b, and 418c in a network 400 in which the segment length "n" is four. Other network nodes may be intermediate nodes 420, which may not receive route segments 430a-c.

In another example embodiment, the network controller 410 may transmit and install a route segment 430 on a segmentation node 418 one at a time. After the data packet has been forwarded through all of the links 440 identified by its current route segment 430, the segmentation node 418 that just received the data packet may determine whether the segmentation node 418 has the correct routing information. If the segmentation node 418 does not have the routing information, the segmentation node 418 may request the routing information from network controller 410. After receiving route segment 430, the segmentation node 418 may append new routing information to the data packet. To determine whether a segmentation node 418 stores the proper routing information, the segmentation node 418 may look up routing information using information within the data packet, e.g. source address, destination address, previous route information, input port, etc. Once the segmentation node 418 has obtained the new route information, the segmentation node 418 may replace the previous route information with the new route information prior to forwarding the data packet to the next segmentation node 418 in the network 400. As shown in FIG. 4, the routing information appended to the data packet may comprise output link information, next-hop network nodes, output ports information, and/or any other suitable information that signals to the segmentation nodes 418 and/or intermediate nodes 420 a location to forward the data packet.

In an example embodiment of the network 400, the network 400 may employ strict link source routing in creating route segments 430. As such, the route segments 430 may explicitly describe each and every specific link 440 over which the data packet should be forwarded. In other words, the aggregate of route segments 430 may describe the exact route that the data packet will travel from source node 450 to destination node 460 through network 400, and explicitly tell each segmentation node 418 over which link 440 and to what other segmentation node 418 it should forward the data packet.

After appending the routing information, segmentation node 418 may forward the data packet based on the routing information appended to the data packet. To determine a location for forwarding the data packet, the segmentation node 418 may examine a pointer 470 within the data packet that references the appropriate routing information. The segmentation node 418 may then forward the data packet according to link 440 described in the routing information and identified by the pointer 470. As shown in FIG. 4, the pointer 470 points to link 440A when forwarding a data packet from segmentation node 418a to the next node along the path, e.g., intermediate node 420. Once intermediate node 420 receives the data packet, the intermediate node may also examine the pointer 470 to obtain routing information from the data packet. The intermediate node 420 may not use a forwarding table or any other type of routing table in determining how to forward the data packet. Pointer 470 may be incremented in order to point to the appropriate routing information e.g., link 440B.

The intermediate nodes 420 may continue to read and increment the attached pointer 470, and forward the data packet accordingly until the data packet reaches the next segmentation node 418b. Segmentation node 418b may then examine the pointer 470 and determine that no other links are referenced in the routing information appended by segmentation node 418a. Segmentation node 418b may search for and/or request the next route segment 430b from the network controller 410, and after receiving the route segment 430b, replace routing information within the data packet with the routing information obtained from route segment 430b. The segmentation node 418b may then forward the data packet in a manner similar to that of segmentation node 418a. Intermediate network nodes 420 may operate as previously discussed and forward the data packet to the next segmentation node 418, as discussed above.

Figure 5:
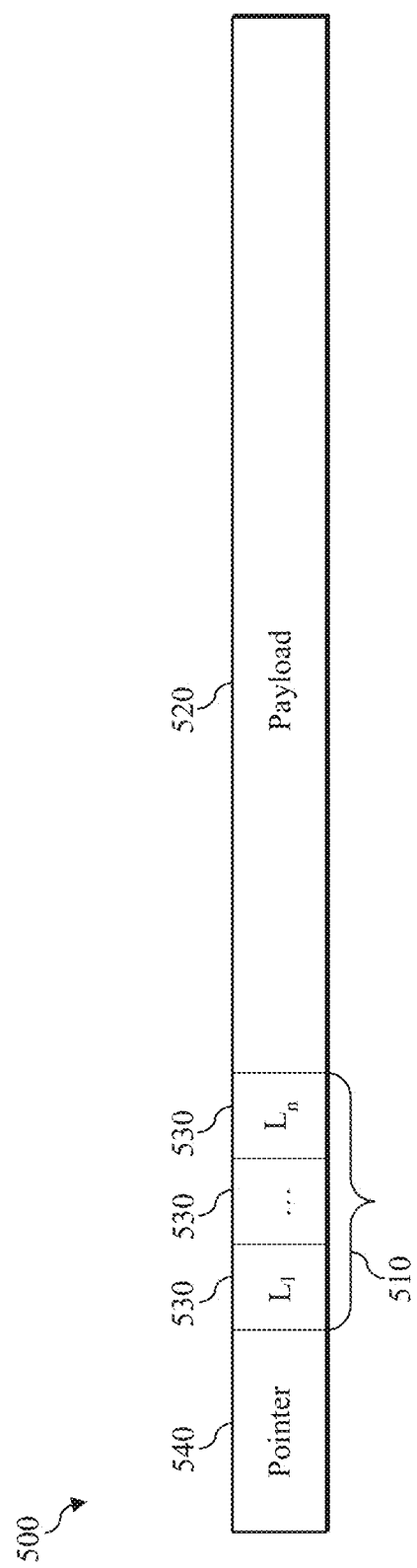
FIG. 5 is a diagram of an example embodiment of a segmented source routing data packet.

FIG. 5 is an example embodiment of a data packet 500. The data packet 500 may be used in various example embodiments that implement the techniques disclosed herein, e.g. the segmented source routing of network 400. The data packet 500 may comprise a routing header 510, a payload 520, and a pointer 540. The payload 520 may be any data that a user wishes to transport over a network, e.g. SDN network 100 and/or the Internet, from a source to a destination, and may be received by a segmentation node from a source node. The routing header 510 may comprise routing information that a segmentation node may append to data packet 500 traversing along a path. Routing header 510 may be route information based on route segments sent from a network controller to the segmentation node. The routing information may comprise a list of one or more network links, a list of one or more next-hop routers, a list of one or more output ports, or any other suitable information that signals to the segmentation node and/or intermediate node a location to forward the data packet 500. The pointer 540 may comprise an indicator that is examined by a segmentation node and/or intermediate node to determine which specific piece of routing information in routing header 510 should be used next in forwarding the data packet 500.

Returning to routing header 510, the routing header may further comprise a segment or portion of the complete routing path for the data packet 500. The route segment may comprise "n" links 530, where "n" is an integer, and where each route segment comprises an identification of one or more network links coupling network elements between which the associated data packet 500 should be forwarded. In an example embodiment of routing header 510 in which the total number of network links over which the data packet 500 should be transmitted is not divisible by n, the final route segment may contain "m" links, wherein "m" is an integer and "m"<"n". For example, in FIG. 4 the network contains 14 links and has a segment size of four (e.g. "n"=4). The final route segment in FIG. 4 contains the remaining links in the network and has a size of two (e.g. "m"=2). The number of links 530 in each route segment of the routing path, e.g. the size of each route segment, may be a pre-defined matter of design choice, determined by a network administrator based on the data overhead available in the network, or determined dynamically by the network controller. The total size of the route segment may be a bounded value that varies from one network to another as the amount of data overhead in each respective network, and the design considerations for data traffic flow in the networks may vary.

Figure 6:
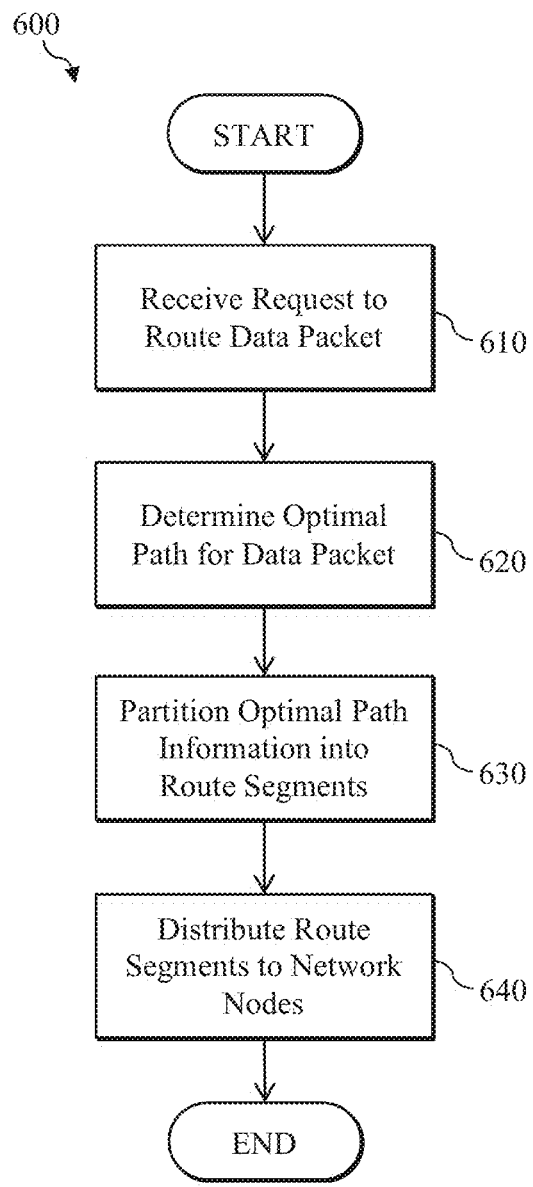
FIG. 6 is a flowchart of an example embodiment of a method used for partitioning and distributing segmented source routing information.

FIG. 6 is a flowchart of an example embodiment of a method 600 used for partitioning and distributing segmented source routing information. Method 600 may be implemented in a network controller, such as network controller 200. At step 610, method 600 may receive a request from a segmentation node, e.g. segmentation node 418, to route a data packet from a source node to a destination node. At step 620, method 600 may use any suitable data routing technique as discussed above and known to one of ordinary skill in the art to determine an optimal path for the data packet. Method 600 may generate routing information for the optimal path that may be used to identify one or more connections or links between network nodes along the path. At step 630, method 600 may partition the routing information into smaller route segments, e.g. route segment 430. The routing information for the optimal path may be partitioned by dividing the routing information so that each route segment may be a unique proper subset of the complete optimal path information with each route segment containing less than all of the complete optimal path information. The number of links for the optimal path present in each route segment may depend on the amount of data overhead available in a given network and may vary from network to network. The number of links in each route segment may be about equal, or alternatively, the last route segment may have fewer links than each of the preceding route segments. At step 640, the method 600 may distribute the route segments to one or more segmentation nodes in the network. The method 600 may distribute the route segments to segmentation nodes on a segment boundary, e.g. a location at which a data resides but has been forwarded through all links in its current route segment and is awaiting a new route segment describing additional network links over which the data should be forwarded. Alternatively, the method 600 may distribute the first route segment to the first segmentation node in the network and distribute subsequent route segments in response to requests from other segmentation nodes in the network that are located at segment boundaries.

Figure 7:
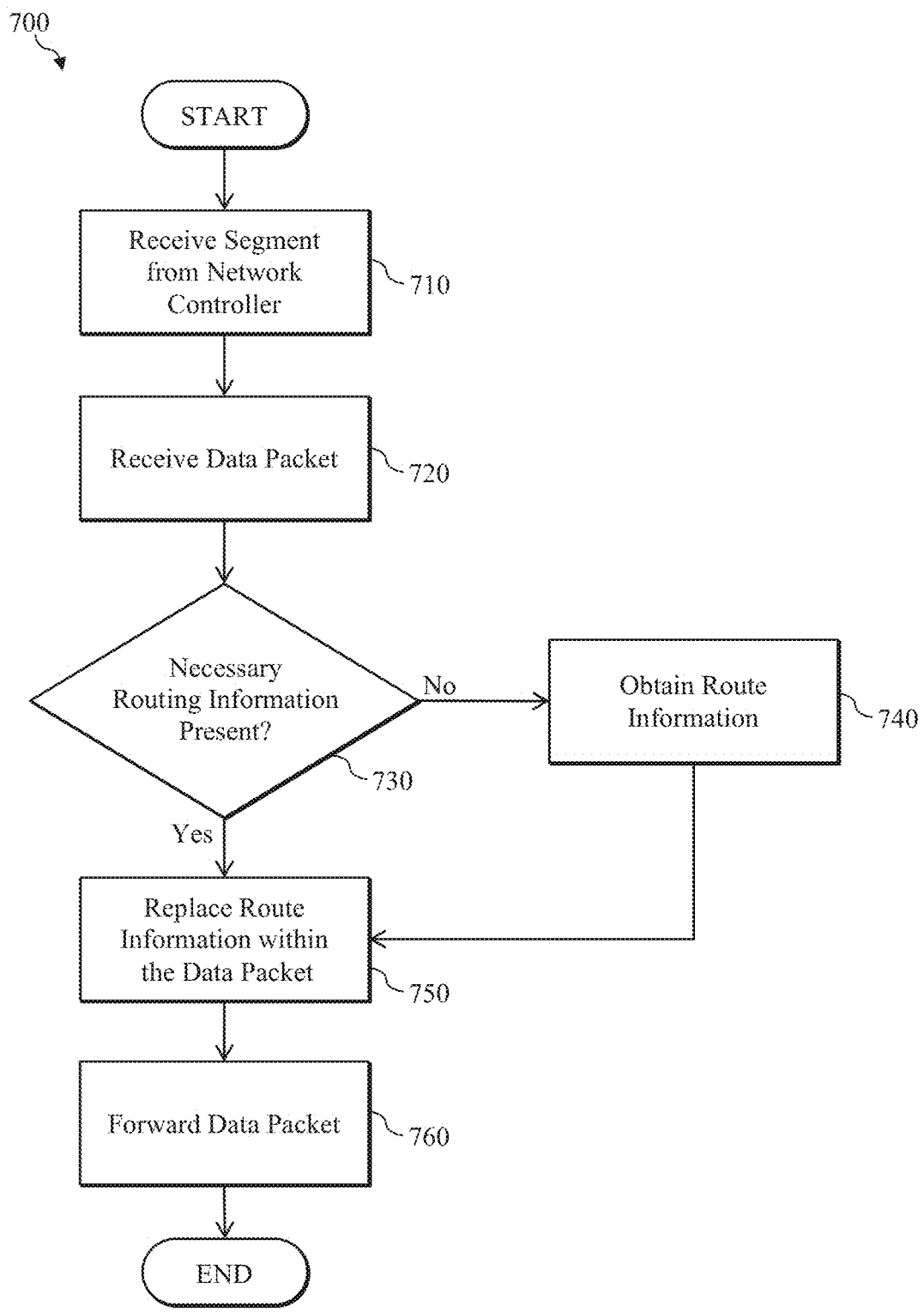
FIG. 7 is a flowchart of an example embodiment of a method used for forwarding a data packet based on segmented source routing.

FIG. 7 is a flowchart of an example embodiment of a method 700 used for forwarding a data packet based on segmented source routing. Method 700 may be implemented in a segmentation node, such as segmentation node 300. At step 710, method 700 may receive a route segment from a network controller, for example network controller 200, which may describe links over which a data packet should be forwarded. At step 720, method 700 may receive a data packet from a previous segmentation node in the network. Alternatively, if method 700 has not received a route segment from the network controller before receiving the data packet from the previous segmentation node, at step 730, method 700 may determine whether the route information necessary for forwarding the data packet is within the data. If the information is not within the data packet and has not been received from the network controller, method 700 may search for and request the appropriate route segment at step 740. Method 700 may search for the routing information within the route segment using information unique to the data packet, e.g. source address, destination address, input port, current location, etc. At step 750, method 700 may overwrite or replace the old routing information currently appended to the data packet with the new routing information received from the network controller prior to forwarding the data packet over the next link described in the route segment. At step 760, method 700 may examine a pointer attached to the data packet that identifies which link in the route segment is the next link for forwarding and may forward the data packet over the corresponding network link to a subsequent segmentation node.

At least one example embodiment is disclosed and variations, combinations, and/or modifications of the example embodiment(s) and/or features of the example embodiment(s) made by a person having ordinary skill in the art are within the scope of the disclosure. Alternative example embodiments that result from combining, integrating, and/or omitting features of the example embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l + k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are example embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several example embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various example embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

I claim:

1. A method implemented in a network controller configured to perform source routing, the method comprising:
   receiving a request from a network node to determine a path for transporting a data packet from a source node to a destination node;
   determining the path to transport the data packet from the source node to the destination node;
   partitioning a description of the path into a plurality of route segments; and
   distributing the route segments to segmentation network nodes, but not intermediate network nodes disposed between the segmentation network nodes, prior to receipt of the data packet by the segmentation network nodes, to permit the segmentation network nodes to append routing information to the data packet when received so that the segmentation network nodes and the intermediate network nodes are able to route the data packet using the appended routing information in the absence of reference to a forwarding table, and
   wherein each of the route segments describes a portion of the path.

2. The method of claim 1, wherein the routing segments comprise a plurality of links used to forward the data packet, wherein partitioning the description of the path comprises forming a first route segment describing a first portion of the links over which the data packet will be forwarded and a second route segment describing a second portion of the links over which the data packet will be forwarded.

3. The method of claim 2, wherein the number of connections in the first route segment is not the same as the number of connections in the second route segment.

4. The method of claim 1, wherein the appended routing information indicates a plurality of links associated with the path, and wherein the data packet comprises a data payload, one or more links, and a pointer that references the links.

5. The method of claim 1, wherein distributing the route segments comprises sending the route segments to each of the segmentation network nodes in the network located at a segment boundary, and wherein the segmentation network nodes that receive the route segments are based on a segmentation length variable.

6. The method of claim 5, wherein distributing the route segments comprises sending the route segments simultaneously to each segmentation node located at a segment boundary in the network.

7. The method of claim 5, wherein distributing the route segments comprises sending a first route segment to a first segmentation node located at a first segment boundary in the network and sending a second route segment to a second segmentation node located at a second segment boundary in the network, and wherein the number of the intermediate network nodes between the first segmentation node and the second segmentation node is determined by the segmentation length variable.

8. A computer program product comprising computer executable instructions stored on a non-transitory computer readable medium such that when executed by a processor, causes the processor to:
   determine a complete route to forward a data packet from a source node to a destination node;
   partition a description of the complete route into a plurality of route segments;
   obtain a segment length variable that determines a number of intermediate nodes between each segmentation node along the complete route; and
   distribute the route segments to the segmentation nodes, but not the intermediate nodes, prior to receipt of the data packet by the segmentation nodes to permit the segmentation nodes to append routing information to the data packet based on the route segments such that the intermediate nodes are able to forward the data packet using the routing information appended to the data packet without having to reference a forwarding table.

9. The computer program product of claim 8, wherein distributing the route segments to the segmentation nodes comprises sending the route segments simultaneously to each segmentation node in the network that is located at a segment boundary.

10. The computer program product of claim 8, wherein the instructions stored on a non-transitory computer readable medium further causes the processor to select the segmentation nodes along the complete route based on the segmentation length variable, and wherein the segmentation length variable indicates a number of network links for each route segment.

11. The computer program product of claim 8, wherein partitioning the description of the complete route into a plurality of route segments comprises forming a first route segment describing a first portion of a route over which the data packet will be forwarded and a second route segment describing a second portion of the route over which the data packet will be forwarded.

12. The computer program product of claim 11, wherein a number of links in the first route segment is greater than a number of links in the second route segment.

13. The computer program product of claim 8, wherein the instructions stored on a non-transitory computer readable medium further causes the processor to generate a second path for a second data packet, wherein a first segmentation node on the path is part of the second path, and wherein the first segmentation node does not receive route segments that correspond to the second path.

14. The computer program product of claim 13, wherein a first intermediate node on the path is part of the second path, and wherein the first intermediate node receives route segments that correspond to the second path.

15. A method implemented in a network node configured to perform segmented source routing, the method comprising:

receiving a data packet;

examining a pointer that references route information appended to the data packet; and forwarding the data packet from a first segmentation node, through at least one intermediate node, and to a second segmentation node according to the route information referenced by the pointer, wherein the first segmentation node and the second segmentation node, but not the at least one intermediate node, append the route information to the data packet, wherein the route information represents a portion of all routing information used to route the data packet from a source node to a destination node, and wherein the data packet is forwarded without using a forwarding table.

16. The method of claim 15, wherein the data packet comprises a data payload, a list of links used to route the data packet, and the pointer that references the next link for forwarding the data packet.

17. The method of claim 15, further comprising receiving a route segment that comprises a portion of the route information used to forward the data packet from the source node to the destination node.

18. The method of claim 17, further comprising requesting the route segment used to forward the data packet when unable to locate appropriate route information that corresponds to the data packet within the network node.

19. The method of claim 17, wherein the network node receives route segments for a first path and does not receive route segments for a second path.

20. The method of claim 16, further comprising receiving a route segment that indicates the links to forward the data packet and replacing the route information appended to the data packet with a second route information obtained from the route segment.

* * * * *